United States Patent
Ben-Or et al.

(10) Patent No.: US 11,538,044 B2
(45) Date of Patent: Dec. 27, 2022

(54) SYSTEM AND METHOD FOR GENERATION OF CASE-BASED DATA FOR TRAINING MACHINE LEARNING CLASSIFIERS

(71) Applicant: Nice Ltd., Ra'anana (IL)

(72) Inventors: Pinchas Ben-Or, Issaquah, WA (US); Yoav Avneon, Nes-Ziona (IL)

(73) Assignee: Nice Ltd., Ra'anana (IL)

( * ) Notice: Subject to any disclaimer, the term of this patent is extended or adjusted under 35 U.S.C. 154(b) by 385 days.

(21) Appl. No.: 15/983,200

(22) Filed: May 18, 2018

(65) Prior Publication Data
US 2019/0354993 A1    Nov. 21, 2019

(51) Int. Cl.
*G06Q 30/00*    (2012.01)
*G06N 20/00*    (2019.01)

(52) U.S. Cl.
CPC ......... *G06Q 30/0185* (2013.01); *G06N 20/00* (2019.01)

(58) Field of Classification Search
CPC . G06Q 30/0185; G06Q 50/01; H04M 7/0078; H04M 2203/6027
See application file for complete search history.

(56) References Cited

U.S. PATENT DOCUMENTS

| 9,294,497 | B1 | 3/2016 | Ben-Or et al. |
| 2010/0076913 | A1* | 3/2010 | Yang ............... G06N 7/005 706/13 |
| 2017/0140382 | A1* | 5/2017 | Chari ............... G06Q 20/389 |

OTHER PUBLICATIONS

Gutfraind, Alexander, Ilya Safro, and Lauren Ancel Meyers. "Multiscale network generation." 2015 18th international conference on information fusion (fusion). IEEE, 2015. (Year: 2015).*
Fernández, Alberto, et al. "SMOTE for learning from imbalanced data: progress and challenges, marking the 15-year anniversary." Journal of artificial intelligence research 61 (2018): 863-905. (Year: 2018).*
Ramoni et al. "Robust Learning with Missing Data" Machine Learning, 45, pp. 147-170, 2001; Sep. 5, 2000; Kluwer Academic Publishers (2001).
Heckerman et al. "Learning Bayesian Networks: The Combination of Knowledge and Statistical Data" Machine Learning, 20, pp. 197-123, 1995; Jan. 30, 1995; Kluwer Academic Publishers, (1995).

(Continued)

*Primary Examiner* — Andrew B Whitaker
*Assistant Examiner* — Brendan S O'Shea
(74) *Attorney, Agent, or Firm* — Pearl Cohen Zedek Latzer Baratz LLP

(57) ABSTRACT

System and method for generating case-based data including receiving, input data describing an event of interest; if the input data is not in a format of a property graph then transforming the input data into a first property graph describing the event of interest and representing a first network, wherein the first property graph includes a plurality of network elements and properties of at least some of the plurality of network elements, wherein the network elements include entities and links describing relationships between the entities; changing a network element in the first property graph to create a second property graph of a new network; and using the second property graph as the case-based data. New properties may be generated for the entities and links.

20 Claims, 7 Drawing Sheets

(56) References Cited

OTHER PUBLICATIONS

Madigan et al. "Model Selection and Accounting for Model Uncertainty in Graphical Models Using Occam's Window" Journal of the American Statistical Association, vol. 89, No. 428 (Dec. 1994), pp. 1535-1546 Published by Taylor & Francis Ltd.

Christiansen et al. "Hierarchical Poisson Regression Modeling" Journal of the American Statistical Association, 92:438, 618-632, pp. 618-632 Published by Taylor & Francis Ltd. on Feb. 17, 2012.

Albert, James H. "Computational Methods using a Bayesian Hierarchical Generalized Linear Model" Journal of the American Statistical Association, vol. 83, No. 404 (Dec. 1988), pp. 1037-1044 Published by Taylor & Francis Ltd.

Graham et al. "Multiply Imputed Synthetic Data Files" Official Statistics Research Series, vol. 1, 2007; pp. 1-45 University of Otago, Christchurch NZ.

Reiter, Jerome P. "Releasing Multiply Imputed, Synthetic Public Use Microdata: An Illustration and Empirical Study" Journal of the Royal Statistical Society. Series A (Statistics in Society), vol. 168 No.1 (2005), pp. 185-205 Published by Wiley for the Royal Statistical Society.

Reiter Satisfying Disclosure Restrictions With Synthetic Data Sets Journal of Official Statistics, vol. 18, No. 4, 2002, pp. 531-543.

Raghunathan, T.E. "Multiple Imputation for Statistical Disclosure Limitation" Journal of Official Statistics, vol. 19, No. 1, 2003, pp. 1-6 Revised Dec. 2002.

Glynn et al. "Multiple Imputation in Mixture Models for Nonignorable Nonresponse with Follow-ups Authors(s)" Journal of the American Statistical Association, vol. 88, No. 423 (Sep. 1993), pp. 984-993 Published by Taylor & Francis Ltd.

Winkler. William E. "Methods for Record Linkage and Bayesian Networks" Statistical Research Division, U.S. Bureau of the Census, Room 3000-4, Washington, DC 20233-9100. Nov. 4, 2002. pp. 3743-3748.

Di Zio et al. "Bayesian Networks for Imputation" Journal of the Royal Statistical Society. Series A (Statistics in Society), vol. 167 No. 2 (2004), pp. 309-322 Published by Wiley for the Royal Statistical Society.

\* cited by examiner

SYSTEM AND METHOD FOR GENERATION OF CASE-BASED DATA FOR TRAINING MACHINE LEARNING CLASSIFIERS

FIELD OF THE PRESENT INVENTION

The present invention relates to generation of case-based data describing an event of interest including complex correlations between data elements for training machine learning classifiers.

BACKGROUND

Detecting fraudulent events in today's economy is a complex task which typically requires investigating an immense volume of data, with complex interrelations and correlations. However, the quantitative nature of financial data and the accurate records at banks, financial institutions and governmental agencies make artificial intelligence, or machine learning (ML) classifiers, a suitable tool for detecting financial fraudulent events. Machine learning algorithms require building a model based on sample inputs and using this model to make predictions on data. In order to train an ML classifier to detect fraudulent events, datasets of both normal behavior and fraudulent behavior are required. Moreover, ideally the number of datasets of normal behavior and fraudulent behavior (of each type) should be about the same, e.g., the datasets should be balanced.

Data may be gathered from real world scenarios. For example, a bank may gather data related to monetary transactions. The data may include various fields or records for holding data related to the transactions, for example, user records holding names, identity numbers, bank account numbers of the people who are involved in the transactions, transactions records including the paying side, the receiving side, the date and amount of the transaction, the currency and other relevant details.

However, fraudulent events are rare (or rarely discovered), so real world data related to these rare and very complex events of interest may be hard to collect. Thus, gathering data from real world scenarios would typically result in having a large number of examples for normal behavior and only a few examples for fraudulent events, e.g., imbalanced data sets. Training an ML model with imbalanced data typically results in a model that is insensitive to fraudulent events, which makes it unsatisfactory for its intended use. The cost of misclassifying an abnormal (fraudulent) example as a normal example is often much higher than the cost of the reverse error.

Synthetic minority over-sampling technique (SMOTE) is an approach to the construction of classifiers from imbalanced datasets. This method combines under-sampling of the majority (normal) class with over-sampling of the minority (fraudulent) class. Over-sampling the minority class involves creating synthetic minority class examples.

Thus, there is a need for generating or synthesizing pseudo real world data. Pseudo-realistic data generation is extremely complex. Some attempts have been made to generate data using probabilistic methods like Bayesian networks. However, these methods require gigantic and complex correlation tables. While this method is complex and requires significant human intervention in building the correlation tables, the results are typically of low quality since it is very hard to generate real world correlation tables.

Thus, a simple, automatic and efficient method for generating pseudo-realistic data is required. In addition to training of ML models, pseudo real world data may be used for a variety of applications, including performing quality assurance (QA) and quality control (QC) of software solutions, model simulation and optimization, product development and demonstrations, etc.

SUMMARY

According to embodiments of the invention, there is provided a system and method for generating case-based data. Embodiments of the invention may include: receiving, by a processor, input data describing an event of interest; if the input data is not in a format of a property graph then transforming or changing, by the processor, the input data into a first property graph describing the event of interest and representing a first network, wherein the first property graph includes a plurality of network elements and properties of at least some of the plurality of network elements, wherein the network elements include entities and links describing relationships between the entities; changing, by the processor, a network element in the first property graph to create a second property graph of a new network; and using the second property graph, by the processor, as the case-based data.

Embodiments of the invention may include transforming, by the processor, the second property graph of the new network into a selected data format.

According to embodiments of the invention, changing a network element may include one of: adding a new entity and at least one link for connecting the new entity, deleting one entity and links connecting the deleted entity, adding one link and deleting one link.

According to embodiments of the invention, changing a network element may include for example adding at least one entity and at least one link for connecting each of the at least one entity, deleting at least one entity and links connecting the deleted at least one entity, adding at least one link, deleting at least one link.

Embodiments of the invention may include deleting, by the processor, the properties of the at least some of the plurality of network elements; generating, by the processor, new properties; and distributing, by the processor, the new properties among elements of the second property graph of the new network.

Embodiments of the invention may include calculating, by the processor, statistics of the properties of the at least some of the plurality of network elements, and generating the new properties may include at least one of: substantially preserving the calculated statistics, using minority oversampling technique, using peers' statistics and using machine learning clustering.

Embodiments of the invention may include calculating, by the processor, a distance between the first network and the new network; and if the distance is not within a predetermined range, then repeating, by the processor, the changing of a network element until the distance is within the predetermined range.

Embodiments of the invention may include calculating, by the processor, a score for the first network; calculating, by the processor, a score for the new network; comparing, by the processor, the score of the first network to the score of the new network; and if a difference between the score of the first network and the score of the new network is not within a predetermined range, then repeating, by the processor, the changing of a network element, the calculation of a score for the new network and the comparison until the difference between the score of the first network and the score of the new network is within the predetermined range.

According to embodiments of the invention, the score may be a risk score.

According to embodiments of the invention, there is provided a system and method for generating case-based data. Embodiments of the invention may include: a. receiving, by a processor, input data describing a fraudulent event; b. if the input data is not in a format of a property graph then transforming the input data into a property graph representing a first network, wherein the property graph includes a plurality of nodes and links describing connections between nodes, and properties of at least some of the plurality of nodes and links; c. calculating a risk score for the first network; d. calculating statistics of the properties of the at least some of the plurality of network nodes and links; e. generating a new network by performing at least one of: adding at least one node and at least one link for connecting the at least one new node, deleting at least one node and links connecting the at least one deleted node, adding at least one link, deleting at least one link; f. generating new properties of at least some of the plurality of links and nodes, wherein generating the new properties comprises substantially preserving the calculated statistics; g. replacing at least some properties of the at least some of the plurality of nodes and links with the new properties; h. calculating a risk score for the new network; i. calculating a difference between the risk score of the first network to the score of the new network; and j. if the difference between the risk score of the first network and the risk score of the new network is below a predetermined threshold, then repeating operations e-j until the difference between the risk score of the first network and the risk score of the new network is above the predetermined threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
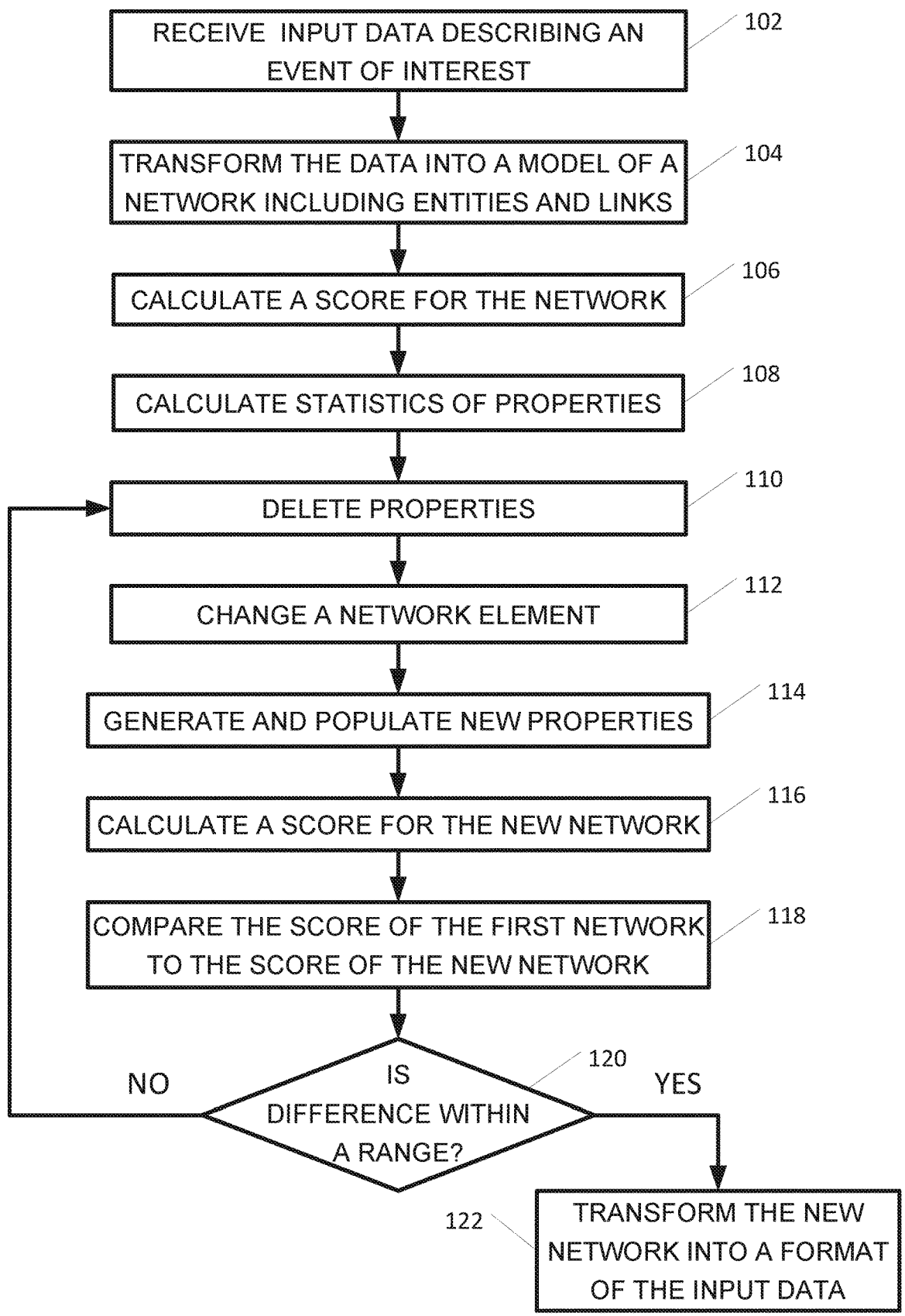
FIG. 1 is a high-level flowchart of a method for generating case-based data, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

An event of interest, also referred to herein as a case, may be, for example, a real-world (physical) event which may be represented by data, such as a person conducting a financial transaction. The data may be any type of data that may be described by a set of entities and links describing relationships between the entities, e.g., a property graph or a network. Transforming data into a network may be performed for example using a mapping file. Examples of data types may include phone records, any data with geographic location, any data that represents an action, e.g., money transaction, service call, computer tasks, process in machines, servers on a network, etc.

Real-world data or datasets, e.g., data or datasets describing an event of interest, are characterized by having multiple correlations or relationships between the variables or fields. The correlations may include spatial correlations, social correlations and temporal correlations. Generating pseudo-realistic data describing an event of interest is an extremely difficult problem due to the complexity of the correlation structure. For example, spatial correlations may exist since people use specific devices such as automatic teller machines (ATMs), pay at specific points of sale (POS), etc., near their daily routes (home, work etc.). As a result, many spatial patterns may be a cause for correlation between specific events and between entities, e.g., data items related to people that work at the same locality, have children at the same school etc., may be correlated. Temporal correlations may be a result of activities that are time dependent, e.g., that occur at specific times of the day, the week etc. In some cases, activities may be correlated both with time and with spatial patterns. Social correlations may include a complex set of correlations that are based on behavior, attributes and activities of people. For example, friends tend to shop at the same places and sometimes spend similar amounts. Friends and family are more likely to transfer money to each other, etc. Social correlation theory may include for example the following effects:

Homophily—people who share any similarity tend to connect to each other.

Influence—people tend to follow the behaviors of friends and close people.

Confounding: correlations forged by external influences from the environment. For example, two individuals living in the same city are more likely to become friends than two random individuals.

Balance theory: correlations resulting from the intuition that "the friend of my friend is my friend" and "the enemy of my enemy is my friend", that drives toward psychological balance.

Social status theory: correlations resulting from the position or rank of an individual in a social community, including the degree of honor or prestige related to the position of the individual.

Social correlations may be extremely hard to predict and model. For example, some of the above listed considerations may have contradicting effects. For example, if a user A relates positively to a user B, and B in turn relates positively to a user C, then according to the balance theory, since C is a friend of a friend of A, a positive relation between C to A may be expected. Status theory, on the other hand, predicts that A regards B as having higher status, and B regards C as having higher status so C should regard A as having low status and hence be inclined to relate negatively to A. Thus, the two theories suggest opposite conclusions in this case.

Embodiments of the invention may provide an automatic and efficient method for generating synthetic pseudo-realistic (case-based) data while maintaining correlations or relationships between variables. According to embodiments of the invention, the correlations or relationships between variables are maintained without the need to explicitly formulate or model these correlations or relationships, and without explicitly providing these correlations or relationships to the generator of the synthetic pseudo-realistic data. Current statistical methods for generating pseudo-realistic data may be too generic and simplified. Specifically, statistical methods may require manually providing detailed probability tables, which imposes great difficulty, and still they do not fully capture the delicate pattern of links, relations and correlations between the different data fields. Additionally, since generating a single example is very cumbersome, they only partially solve the problem of too few examples of events of interest.

Generating a large amount of synthetic pseudo-realistic datasets according to embodiments of the invention may be automatic, efficient and easy when compared with prior methods. According to embodiments of the invention, a plurality of pseudo-realistic datasets may be generated based on data of a single case or a single example. Thus, given a single real-world case or example of an event of interest, numerous, or as much as needed, other examples, referred to herein as case-based data or case-based datasets, may be generated. Training an ML classifier with the generated case-based datasets would provide a better classifier, that is, a classifier that is more sensitive to the events of interest and is more likely to detect these or similar events in real life operation.

According to embodiments of the present invention, a real-world dataset representing or describing an event of interest may be transformed or changed into a property graph describing a network, the network including entities and links describing relationships between the entities, as disclosed herein. A case-based dataset that is different from the real-world dataset but still representing the same or similar event of interest may be generated based on the real-world dataset by changing at least one entity or link in the first property graph to create a second property graph representing a new network. The second property graph of the new network may be transformed into any required data format. The case-based dataset may include the second property graph or, the transformation of the second property graph into the required data format. In some embodiments, properties of at least some of the nodes and links of the original property graph may be changed, the properties may be deleted, and new properties may be generated and populated among the nodes and links of the second property graph. In some embodiments, statistics of the original properties may be preserved while generating the new properties, as disclosed herein. Generating a case-based dataset based on a real-world dataset as disclosed herein may preserve the interrelations and connections of the real-world dataset, without having to investigate, generate and provide these interrelations and connections.

According to embodies of the invention, a single real-world dataset may be used for generating a plurality of case-based datasets by repeating the process disclosed herein, changing a different node or link in each repetition. In some embodiments, a generated case-based dataset, or the property graph of the generated case-based dataset, may be used as an input for a subsequent repetition.

The generated case-based datasets may be used as inputs for training ML classifiers, together with real-world datasets related to normal behavior, thus providing balanced datasets. Training an ML model with balanced datasets typically results in a classifier that is sensitive to the event of interest. Thus, the generated case-based datasets may be used by financial institutions, governmental agencies, the police, etc., to train ML classifiers for detecting fraudulent events. The generated case-based datasets may be used by software developers for QA and QC of software solutions, product development and demonstrations, etc.

Events of interest, may include for example the establishment of a new financial account for the purpose of using it for obtaining a fraudulent loan or extracting funds from other accounts taken over, money transfers to fraudulent accounts from accounts with compromised access, unauthorized transactions or transfers of money, transferring of money without the proper credit by rolling it forward in short period of time. Other events demonstrating suspicious financial activity may include detection of account takeover from a web-device session or application fraud. Application fraud events may include for example two categories. One category may be where a criminal assumes another person's identity (identity theft), solely for the purpose of an application. The application may be for example for a phone contract, credit card account or a loan or a mortgage. The second category of application fraud may be financial fraud, where an applicant has used his or her own name but has made an application for an account, policy, service or insurance claim which contains a material falsehood, such as false employment details, false income, or concealed addresses. The use of a false document (such as a pay slip, bank statement or driving license), when applying for an account, policy, service or insurance claim may also fall within this category. An example of suspicious financial activity may be, for example, a mule-ring where money mule networks of individuals may engage in the transfer of stolen funds and may retain a percentage for the transfer.

Online account takeovers may be one form of identity theft. They may occur when an unauthorized party gains online access to an existing bank account by stealing the access credentials to the account. The unauthorized party may then conduct illegal transactions. These incidents may be increasing in both frequency and levels of financial loss. The target of an account takeover may be a customer holding an account at the financial institution. The ultimate goal of a takeover may be to remove, steal, procure, or otherwise affect funds of the targeted customer. While account takeovers may most often be achieved through the use of malicious software that can exploit just one entry point (Point of Compromise, or POC) into a network to start the theft, unauthorized users may also use social interaction to prompt individuals into disclosing account information. This information allows other fraudulent users to access the account and move the money out of the account in a very short time.

A network as used herein may be any cluster or group of entities, individuals, or institutions that may have links or relationships between them. Networks may be represented in computer generated and manipulated data by a property graph, e.g., a data structure or format that includes entities or nodes connected by links and properties of the entities and the links. A property may describe an attribute, quality, amount, etc. associated with an entity or link. A network as referred to herein may mean the data representation of a real or synthetic network. In a network, entities may also be referred to as nodes. Each entity or link may be assigned with or have attributes or properties. In financial networks, an entity may be a bank account, a customer, a person, or a device, etc. The entities may be described by attributes such as (but not limited to) their presence in a cycle, position in a specific path, or acting as a source or a sink. In a network that is directed where connections between entities are defined in a direction (e.g., towards an entity), a source node or entity may have more outgoing flow and a sink node or entity may have more incoming flow. In other embodiments, a source node may be defined as having greater outgoing flow or transactions than incoming transaction beyond a threshold and vice versa for a sink. A connecting link may describe relationships or connections between entities and with respect to the entities involved. For example, links may include or describe transactions, geographical proximity, family relationship, "friend" (in the sense of social network) relationship (where a link means two entities are friends in a social network), working relationship and geographical description (such as a link indicating devices are in the same store, the same mall, or the same city, or where for example a link means two entities are in an employer-employee relationship, or work for the same employer). Data describing a network may thus describe a real-world physical entity with relationships. Entities and links may have a categorical feature named type (e.g., for defining the type of relationship, e.g. a link can be of type transferred money to, logged in with, related to, works at, etc.

Thus, networks may describe real world events such as transactions. For example a transaction may be represented as a link of type: transaction between a first entity representing a first person or a first bank account and a second entity representing a second person or a second bank account. The transaction link may include properties such as date, amount, currency etc. A network may include a plurality of transactions (represented as links) between a plurality of bank accounts (represented as entities), and other types of entities and links between the entities. If no fraudulent event is detected, the network may represent normal behavior. However, if a fraudulent event is detected, the network may represent or describe a fraudulent event or an event of interest. An example of fraudulent financial activity may be a mule-ring where money mule networks of individuals may engage in the transfer of stolen funds and may retain a percentage for the transfer. In this case the links in the network that represent the transactions or transfer of stolen funds may be directly related to the fraudulent event and the network including these transactions may be regarded as a network describing a fraudulent event or an event of interest of type: mule-ring.

Properties or attributes of entities may include profile information, such as summaries of past transactional and event data. For example, profile information may include average account balance, number of check returns, reference data (e.g., addresses, phone number, number of employees) and identifying data (e.g., indices). Properties of links or relationships between entities include type of relationship (for example a relationship of "knows" may contain a "from where" property), as well as reference data, related profiles and identifications. The link properties may be highly dependent on the relationship type. For example if the relationship is a direct link representing a specific action (such as transaction) it may include basic data of the transaction (e.g., amount, date), however if the link represents an aggregation of some kind (such as transaction history) it may include profile and reference data as well (average amount, first transfer etc.). Properties may be arranged for example in pairs of property names, defining the type or category of the property and property values including a specific value of the property category, e.g. property name: job title, property value: manager. Other ways of representing entities and links, and other data structures, may be used.

Risk assessment of a network may provide various fraud alerts on whether an entity or the network or part of the network is at risk for suspicious financial activity. A risk score or rating may be provided to describe for example the likelihood or severity of fraud occurring with an entity or sub-network. The risk score may be produced or based, at least in part, on expert models or predictive models known in the art. These models may use different algorithms to predict or classify events based on historical data or analysis.

Network risk assessment may be performed by receiving data describing a network, such as a property graph or a table of entities and links describing relationships between the entities. The property graph or a table may be given in any appropriate format, e.g., comma-separated values (CSV) file, text file, structured query language database (SQL DB) table, GraphX object, Java script object notation (Json) file, neo4j® (a graph database management system) file, or any other form of two-dimensional (2D) table. Risk scores or ratings may be any numerical value that describes a quantity or likelihood of risk for suspicious financial activity or illegal activity. The risk score may quantify the probability of events of certain types, which may include manifestations or elements of financial crime. For example, risk scores may be between 0 and 1, where 1 describes a high likelihood, or 0 and 100 where 100 describes a high likelihood and 0 describes a low likelihood. Other values may be used, for example, risk scores may have positive values for likelihood of fraudulent activity and negative values that may indicate a likelihood or quantity of legal or non-suspicious activity. According to some embodiments risk scores may be used as a metric for characterizing a network. For example, two networks may be compared, and the difference or distance between the two networks may be assessed, measured or estimated by comparing the risk factors of the two networks.

A difference or distance between two networks may be a value representing how different are the two networks. In some embodiments the risk score or rating may be calculated as described in U.S. Pat. No. 9,294,497, to the applicant of the present application, which is incorporated in its entirety herein by reference.

Reference is now made to FIG. 1 which is a high-level flowchart of a method for generating case-based datasets, according to embodiments of the invention. In operation 102 input data describing an event of interest may be obtained. The input data may be provided at a specific format e.g., data structure. The input data may include an example of an event of interest, composed of a plurality of records per event, e.g., normalized tables, flattened tables, property graphs etc. The input data may be derived from real-world cases by extracting relevant data from relevant databases, or it can be generated manually using any applicable method.

In operation 104 the input data may be transformed or changed into a property graph representing a model of a network. The property graph may include network elements including a plurality of entities and links describing relationships between the entities, and properties of at least some of the plurality of network elements. In some embodiments the input data may already be in network format, e.g., a property graph, so operation 104 may not be required and the input data may be used as is. The process of transforming the input data into a property graph may be referred to herein as mapping. The property graph may be for example in the form of Json, 3 network risk assessment (NRA) csv files (e.g., 3 tables describing the property graph at its different levels: the nodes and their properties, the links and their properties and properties of the entire graph, such as topographic properties or aggregations of the entire nodes/links), GraphX property graph etc.

For example, input data may include data that represents a specific event of interest. The input data may include for example the following records:

Transaction level data—(SQL DB) a table with data related to transactions. Data may include basic information regarding the transaction and parties involved.

Profile data—(SQL DB) a table with data related to accounts history and activity, including variables describing and defining the links between two entities, such as the total amount of transactions ever, the total amount of transactions within a specific period of time, first ever transaction between a pair and last ever transaction between a pair.

Reference data—(SQL DB) a table with data related to accounts, including variables describing properties such as reference data, establishment date of the account and business/personal account.

In order to transform these records into a property graph of a network, a mapping file may be used. A mapping file may include instructions for building links and entities, including properties for the links and entities, and pointers to property values.

Figure 6:
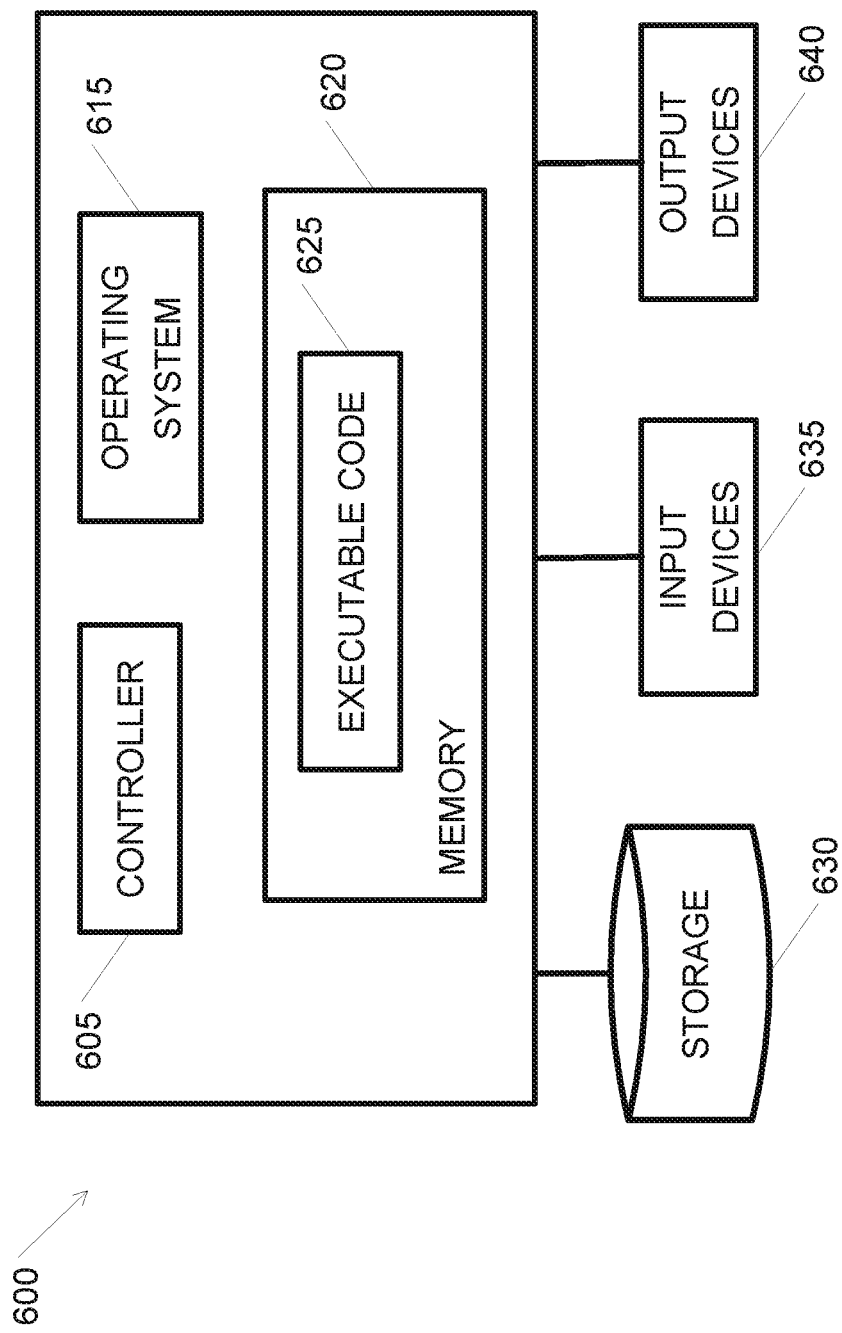
FIG. 6 is a schematic illustration of an example of a computing device, according to some embodiments of the present invention.

A property graph may include for example:

Names of input data files and locations of the input data files (e.g., in memory 620 or storage 630 depicted in FIG. 6).

For nodes, for example: a record including node identifier (ID), node type name, node properties, basic structured query language (SQL) like queries, for example: minimum, maximum or average of a certain field.

For links, for example: a record including link ID, source node ID, target node ID, link type name, link properties, and basic SQL like queries, for example: minimum, maximum or average of a certain field.

Other types of input data, mappings and property graphs may be used.

In operation 106 a score or rating of the first network may be calculated. The score may be a numerical value describing the network. In some embodiments the score may be a risk score. In some embodiments of the invention the risk score may be specific to the type of event of interest. Risk scores may be calculated based on risk models, and risk scores of different types of events of interest may be calculated differently, based on the different types of risk models. Models predicting risk for credit card fraud may be different from models for wire fraud and from models for money laundering, and in each one of these, there may be specific risk models for different types of financial risk. Thus, when generating case-based datasets for a specific type of fraud (based on a single case of this fraud), a specialized model, specifically adjusted for measuring the risk for that specific type of fraud may be used for calculating the risk score.

In operation 108 statistics, characteristics or attributes of the properties of the at least some of the plurality of network elements may be calculated. In some embodiments, calculating statistics may include generating a link probability table (LPT), and calculating descriptive statistics for node/link properties, e.g., type (format of the data, e.g., Boolean, string, sequential, double, native numeric, categorical, etc.), mean, median, common (a most abundant value), distribution etc. of properties of nodes or links statistics may be calculated per category, e.g., for each property category statistics of properties values may be calculated. For example, for quantitative property categories, such as amount, calculating statistics may include calculating mean, median, standard deviation distribution etc. For descriptive properties, e.g., job title, a distribution function of the property values may be calculated. Statistics may be calculated for a group of nodes or links. Nodes and links may be grouped according to any applicable method. For example, nodes may be grouped according to a common property value, or a plurality of common property values. For example, all nodes with property value "distinguished" at property category "client type" may be grouped and statistics on other properties of these nodes may be calculated. In some embodiments, nodes or links may be grouped using ML clustering. ML clustering methods may include gradient boost random forests, support vector machine, Bayesian networks etc.

According to some embodiments, a distribution function, a cumulative distribution function or a probability mass function, may be defined for each or some of the property types, for defining the probability that a property type would equal certain values. In some embodiments, fitting a distribution function to a property type may be performed using, for example, maximum likelihood estimate (MLE). In some cases properties may be interdependent. For example, properties such as a number of transactions, total amount, minimum amount, and maximum amount may be interdependent. In some embodiments, ML clustering techniques (e.g., k-means clustering, gradient boost random forests etc.) may be used to generate an ML clustering model for describing dependencies between properties. In some embodiments Bayesian networks may be used to model interdependencies.

An LPT may refer to a table where each cell holds the probability for a directional link $L_a$ of type a between Entity $E_x$ (of type x) and $E_y$ (of type y; x and y may be identical). Mathematically:

$$p(L_a|E_x \rightarrow E_y) \quad \text{(Equation 1)}$$

A dataset or a plurality of datasets may be characterized by one or more LPTs. The LPT may be local, e.g., defining link probabilities in the current dataset, intermediate, e.g., defining link probabilities in a group of datasets (of peer or related cases), global, e.g., defining link probabilities in all the input datasets and external, e.g., defining link probabilities based on other sources than the data itself, such as industry standards (commodity, tradeable).

In operation 110, all of the properties of all of the network elements, or some of the properties of at least some of the network elements, may be deleted. In some embodiments, it may be determined manually which properties may change, and which should remain the same.

In operation 112, a network element in the model of the network, or in the property graph, may be changed (e.g., added or deleted) to create or generate a property graph of a new network. Changing a network element may include adding one or more new entities and one or more links for connecting the new entity or entities, deleting or reaming one or more entities and links connecting the deleted entity or entities to other entities, adding one or more links and deleting one or more links. In some embodiments a single or small-scale change is made in each iteration, e.g., a single node and respective links are deleted or added, or a single link is deleted or added. Making a small-scale change enables creating variations of the event of interest while utilizing the structural robustness of the network, e.g., small changes in a gigantic correlation structure generates a new case but largely keeps the correlations of the input data.

According to some embodiments, LPT calculated in operation 108 may be used when adding a new link, so that correct or more probable links between entities may be added. More specifically, LPT may provide information, based on the original network, which node entity may be linked to which entity type with which link type, with probability p, e.g., as indicated by equation 1. Thus, a new link may be added in accordance with the knowledge derived from the example cases and/or on the entire population.

According to some embodiments, when changing a network element, or replacing properties, care should be taken to not change elements or property values that relate directly to the fraudulent event. For example, if in operation 120, it is determined that the distance or difference between the original network and the new network is too large, e.g., above a threshold, it may be attributed to a change that relates directly to the fraudulent event. In this case the new network may be deleted, and the process may return to operation 110 for generating a different new network. In some embodiments, certain links, elements or properties may be labeled or marked, e.g., manually, so that they may not be changed in the process. For example, links and entities may include a property that may indicate, or may be set to indicate, that the links and entities are of high significance and should not be changed. In some embodiments, an importance or significance of an entity or a link may be estimated, and entities with high significance rating may not be deleted or altered in the process. For example, importance or significance of entities may be estimated using methods such as centrality measures, betweenness, eigenvector etc. Importance or significance of links may be estimated by estimating the resilience (e.g., the effect of removing the link on the network's integrity) of the link, e.g., using local and global approaches for identifying edge importance, for example, by natural candidate techniques etc.

In operation 114, new properties may be generated and populated (or distributed) among elements of the property graph of the new network. In some embodiments, generating the new properties may include substantially, e.g., partially or fully, preserving calculated statistics, e.g., the statistics calculated in operation 108. In some embodiments metadata may be used. Preserving calculated statistics may include for example, generating new property values while keeping some or all of the statistics unchanged. For example, the average and standard deviation, of a property value may be the same as the original average and standard deviation. Using peers' statistics may include using statistics of another group of nodes with similar characteristics from the network as a basis or reference for generating new values, e.g., properties of one group of workers, or statistics of properties of one group of workers, may be used as a basis for generating properties for other workers with similar characteristics. In some embodiments ML clustering may be used to find peers, e.g., distinct groups that may be used as peers. In some embodiments generating and populating new properties may be done automatically. In some embodiments, a human operator may be involved, for example a human operator may manually define groups, e.g., a human operator may define based on which property categories nodes or lines may be grouped. In some embodiments, Monte-Carlo Markov-chain (MCMC) sequence may be used to generate properties based on a Bayesian networks model generated in operation 108. In some embodiments, statistics of the original properties may be generated (e.g., in operation 108) and the original property values may be replaced with new values sampled from the statistics, e.g., from the property type distribution function and/or the ML clustering model, and/or the MCMC sequence model, and/or other statistics, and/or any combination thereof.

In operation 116 a score of the new network may be calculated. The score may be calculated in similar fashion to the score calculated in operation 106. In operation 118 the score of the first network may be compared with the score of the new network. In operation 120 a distance between the first network and the new network may be calculated or estimated. In some embodiments a distance may be calculated by comparing the score of the first network to the score of the new network. However, other methods for calculating the distance between the first network and the new network may be used (thus, operations 106 and 116 may not be required). If the distance is within a predetermined range, then in operation 122, the second property graph of the new network may be the output of the method, e.g., the case-based dataset. The second property graph of the new network may be transformed into a selected data format, if required. The range may be defined by one or two thresholds. For example, the range may be defined as being above a threshold, e.g., different enough from the original network, below a threshold, e.g., close enough to the original network, or both, e.g., above a first threshold and below a second threshold.

The output may include for example:
A property graph object, e.g., a data file including the property graph.
The new properties generated in operation 114, e.g., one or more LPTs such as population level LPT, peer cases level LPT, and industry standards level LPT.

Descriptive statistics of the property graph, e.g., the number of nodes, the number of links, link and node types, and other metadata including date of creation, configurations, logs, etc.

ML-based clusters of nodes and links, e.g., the result of the ML clustering conducted in operation 114.

The calculated score, e.g., the score calculated in operation 116.

However, if the distance is not within a predetermined range, or if the difference between the score of the first network and the score of the new network is not within the predetermined range, then operations 110-120 may be repeated until the distance or difference is within the predetermined range. It should be readily understood that in some embodiments operations 110 and 114 may be performed in every iteration, and in some embodiments operations 110 and 114 may be performed only in the first iteration, and not repeated in following iterations.

According to some embodiments, if in operation 120 the distance or difference is within the predetermined range, then the new network may be used as input data to embodiments of the method for generating case-based datasets, for generating another set of case-based dataset, and so forth. Additionally or alternatively, the same input data may be used over and over again for generating a plurality of case-based datasets, by making a different change to the property graph in operation 112 in each iteration. Thus, a single input dataset of an event of interest may be used for generating a plurality of case-based datasets, in a very efficient manner.

Figure 2:
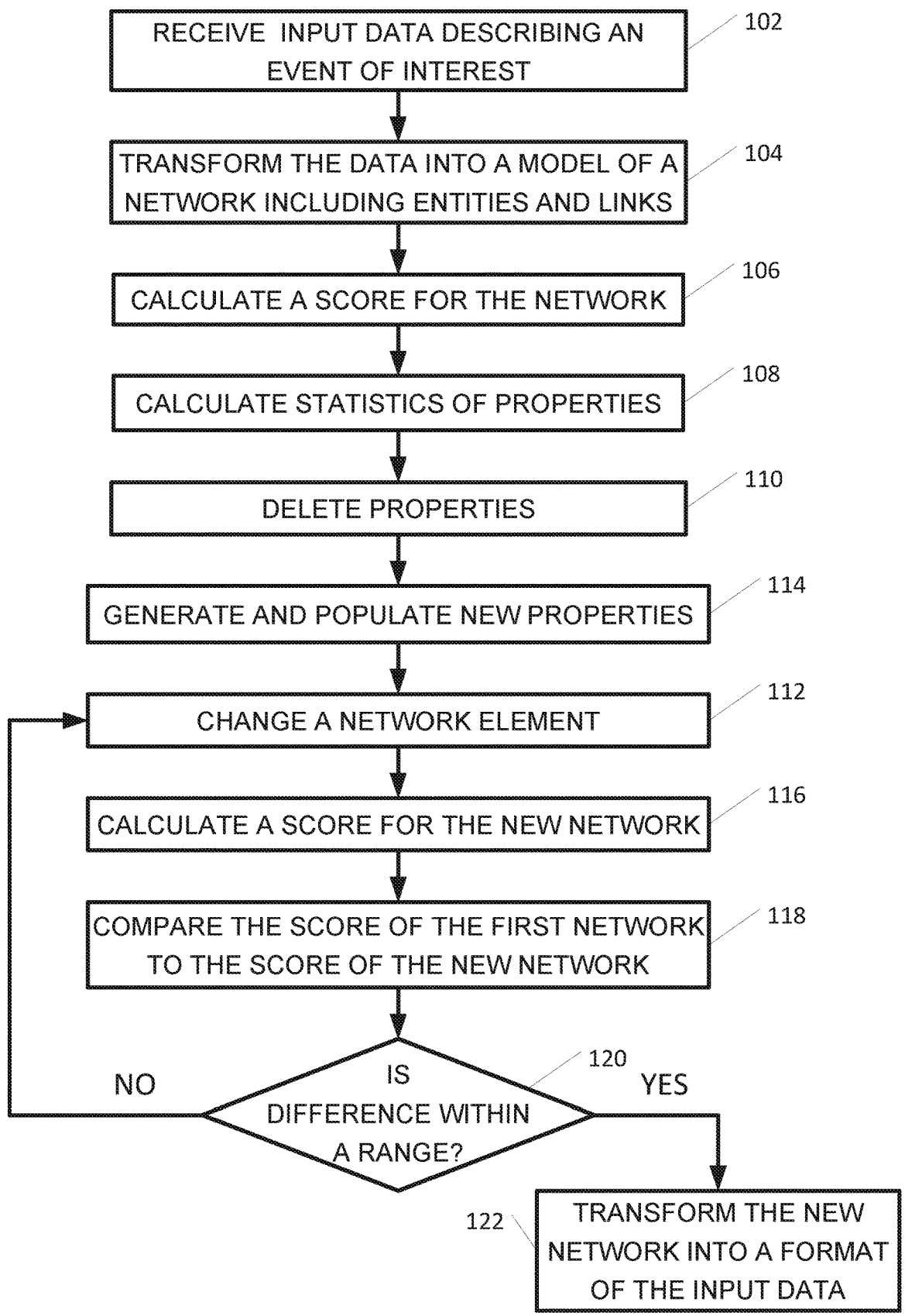
FIG. 2 is a high-level flowchart of a variation of the method for generating case-based data, according to embodiments of the invention.

Reference is now made to FIG. 2 which is a high-level flowchart of a variation of the FIG. 1 method for generating case-based datasets, according to embodiments of the invention. In this variation, operations 110 and 114 are performed only in the first iteration. In this variation, if the distance or difference is within the predetermined range then the method moves from operation 120 to operation 112.

Figure 3A:
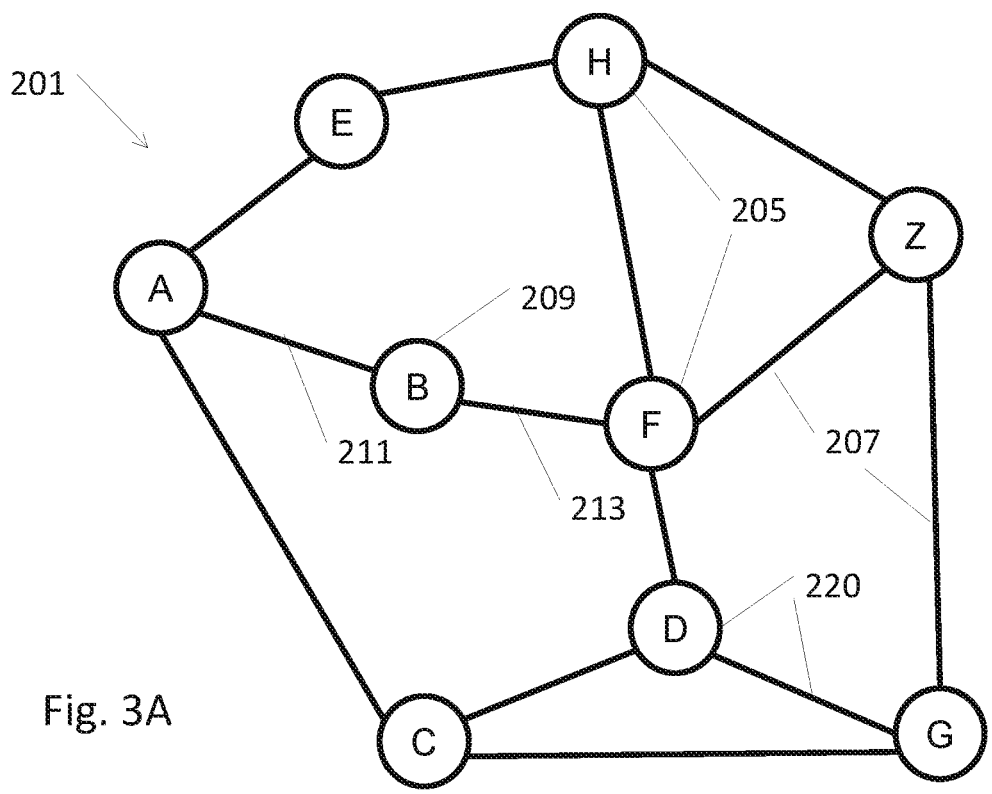
FIG. 3A is an illustration of a network, according to embodiments of the invention.
Figure 3B:
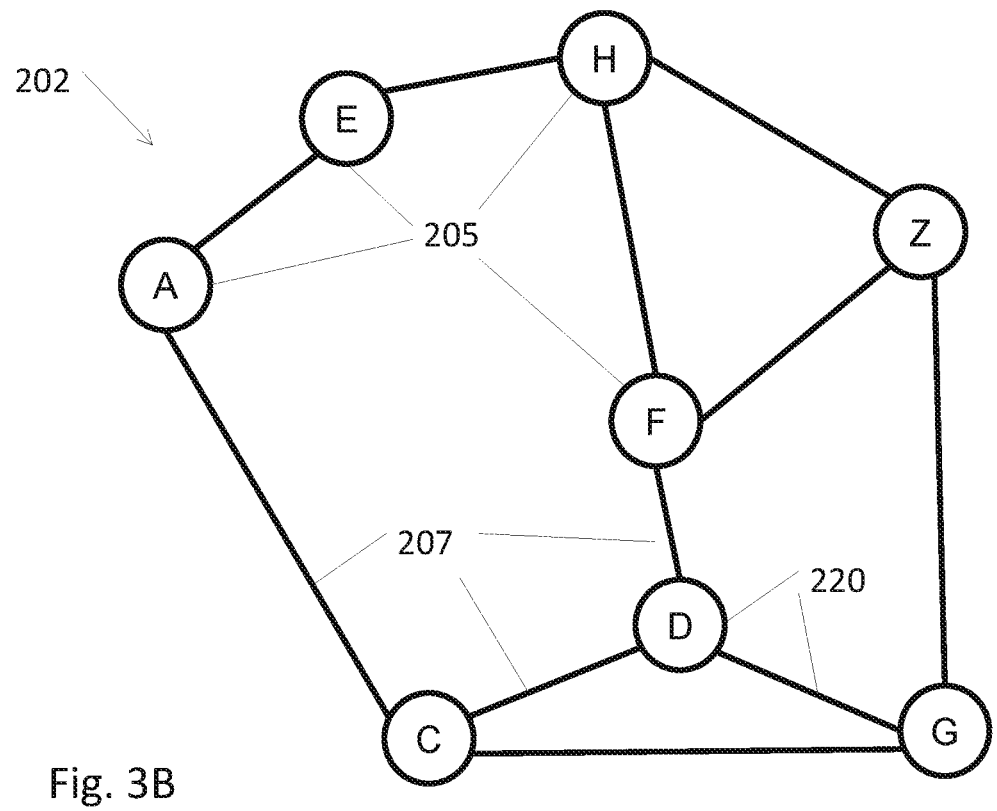
FIG. 3B is an illustration of a second network, created from the network presented in FIG. 3A by deleting one entity and links connecting the deleted entity, according to embodiments of the invention.
Figure 3C:
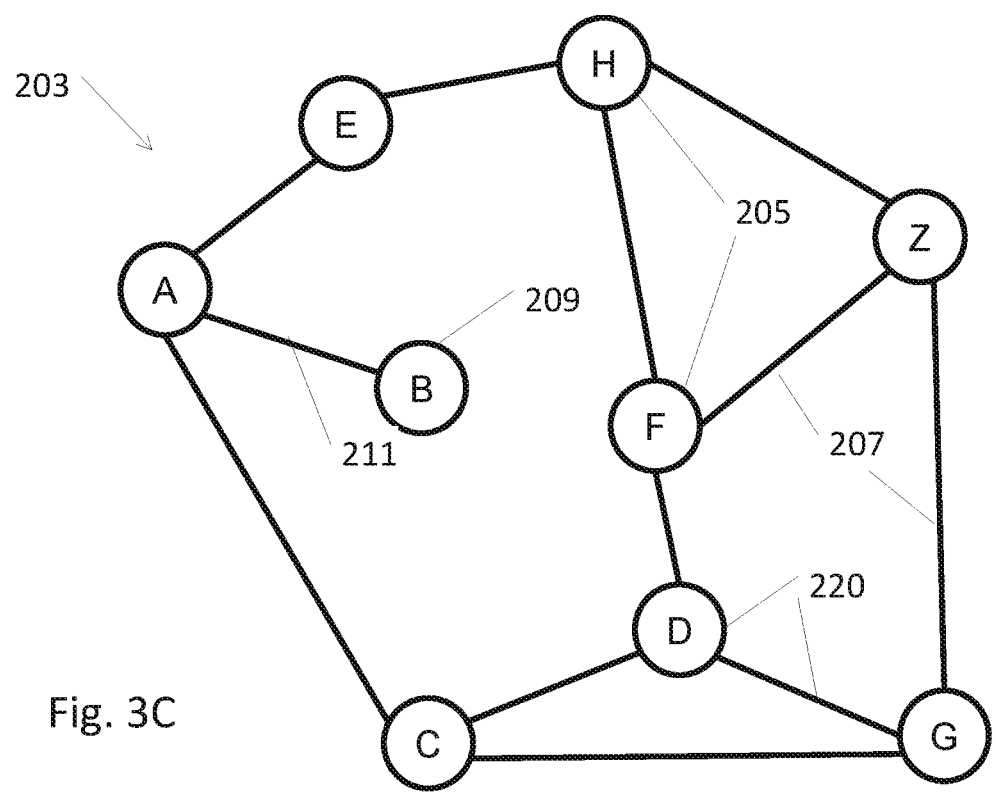
FIG. 3C is an illustration of a third network, created from the network presented in FIG. 3A by deleting one link, according to embodiments of the invention.

Reference is no made to FIGS. 3A-3C which are illustrations of networks according to embodiments of the present invention. FIG. 3A depicts a first network 201, FIG. 3B depicts a second network 202, created from first network 201 by deleting one entity 209 and links 211, 213 connecting deleted entity 209, and FIG. 3C depicts a third network 203, created from first network 201 by deleting one link 213. Networks 201, 202, 203 may include network elements 220 which may include entities or nodes 205 and links 207 between entities 205 that describe relationships between entities 205. Networks 201, 202, 203 may be represented in the form of a property graph. For example, each of entities 205 may represent an individual or institution involved in a financial transaction, and the links 207 between the entities 205 may describe these transactions, or other kinds of relationships between entities 205, such as a friendship or geographical proximity. Some or all of nodes 205 and links 207 may be associated with properties, which may add information regarding the associated node 205 or link 207. Properties may be arranged in pairs of property names and values, e.g. Bank account type: checking.

Figure 4:
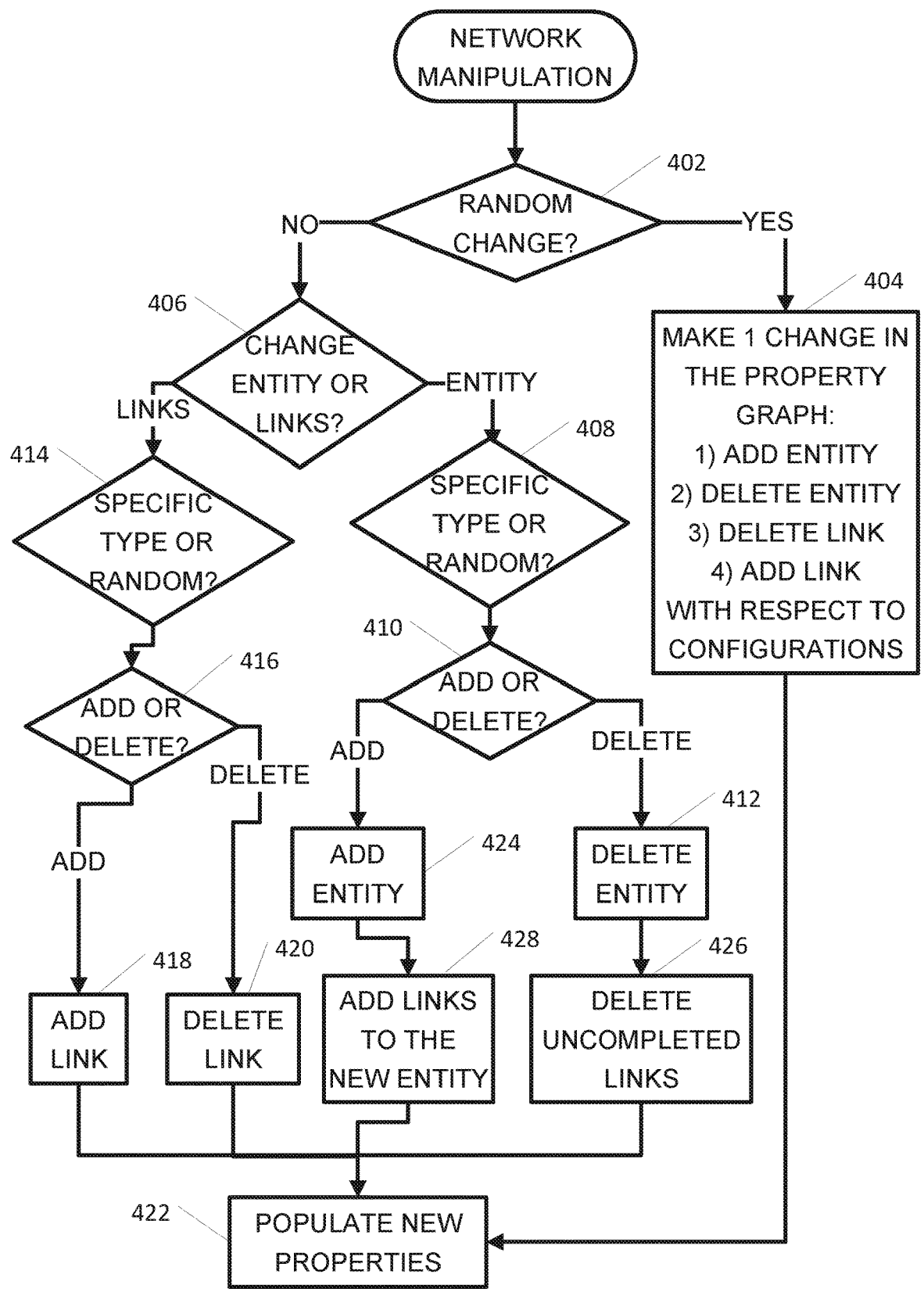
FIG. 4 is a high-level flowchart of a method for changing a network element in a property graph, according to embodiments of the invention.

First network 201 may describe real world events such as transactions. For example, a transaction may be represented as a link 207 of type: transaction between a first entity 205 representing a first bank account and a second entity 205 representing a second bank account. The transaction link 207 may include properties such as date, amount, currency etc. A network may include a plurality of transactions (represented as links 207) between a plurality of bank accounts (represented as entities 205), and other types of entities 205 and links 207 between the entities 205. Reference is now made to FIG. 4 which is a high-level flowchart of a method for changing a network element in a property graph, according to embodiments of the invention. Embodiments of a method for changing a network element in a property graph may be an elaboration of operation 112 depicted in FIGS. 1 and 2. Other methods for changing a network element in a property graph may be used.

In operation 402 it may be determined whether the change is random or manual. As used herein a random change may refer to a change that is randomly selected by the system, e.g., according to one or more configuration parameters. A manual change may refer to a change that is determined by the human operator, e.g., the human operator selects which node and/or link to add or delete. If the change is random, then in operation 404 a single change may be made in the property graph. The change may include for example adding a new entity and at least one link for connecting the new entity to other entities, deleting one entity and links connecting the deleted entity, adding one link and deleting one link.

If the change is not random, then the type of change may be determined according to configuration parameters. The configuration parameters may include the type of change, (e.g., entity or link, add or delete etc.) In operation 406 it may be determined, e.g., based on configuration paraments, whether an entity or a link should be changed. If an entity should be changed, then in operation 408, it may be determined if the entity that will be added or deleted is of a specific type or random, e.g., according to a configuration parameter. In operation 410 it may be determined whether an entity should be added or deleted. If an entity should be deleted, then in operation 412 an entity may be deleted and in operation 426 links connecting the deleted entity are deleted as well. For example, links which, as a result of deleting the entity, have only one connected entity, may be deleted. If it is determined in operation 410 that an entity should be added, then in operation 424 a new entity may be added, and in operation 428 at least one link for connecting the new entity to other entities may be added.

If it is determined in operation 406 that a link should be changed, then in operation 414 it may be determined if the link that will be deleted is of a specific type or random. In operation 416 it may be determined, e.g., based on configuration parameters, if a link should be added or deleted. If a link should be added, then in operation 418 a link is added. If a link should be deleted, then in operation 420 a link may be deleted. In operation 422 new properties may be populated.

Figure 5A:
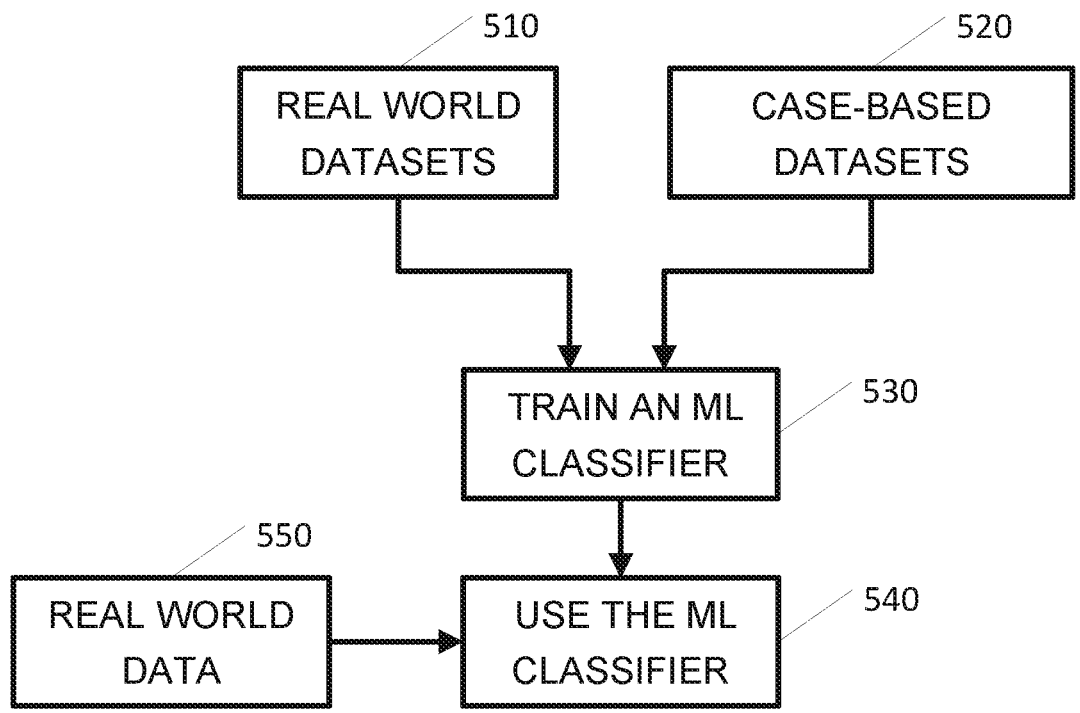
FIG. 5A is a high-level flowchart of a method for training an ML classifier using case-based datasets, according to embodiments of the invention.
Figure 5B:
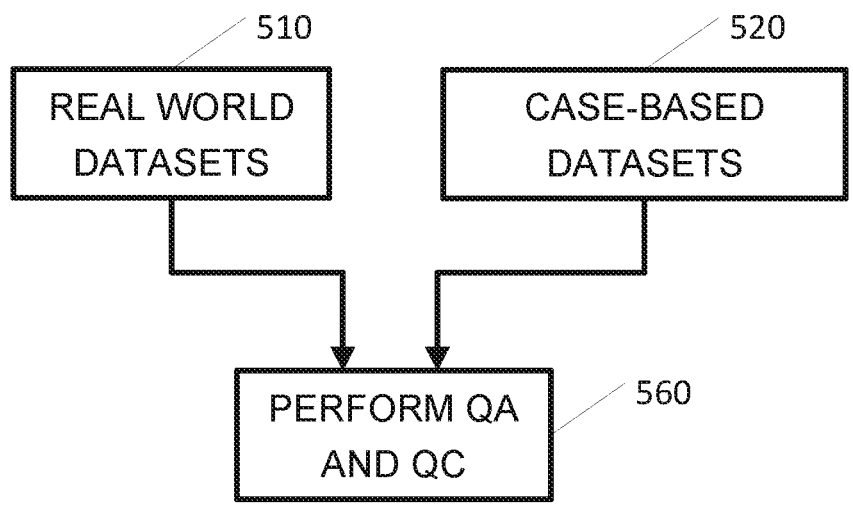
FIG. 5B is a high-level flowchart of a method for using case-based datasets for performing QA and QC of software applications, according to embodiments of the invention.

Reference is now made to FIG. 5A which is a high-level flowchart of a method for training an ML classifier using case-based datasets, and to FIG. 5B which is a high-level flowchart of a method for using case-based datasets for performing QA and QC of software applications according to embodiments of the invention. In operation 530 an ML classifier, or other type of an ML model may be trained, e.g., to detect one or more types of fraudulent events using real-world datasets and case-based datasets, as indicated by blocks 510 and 520, respectively. Typically, the real-world datasets 510 may include a plurality of datasets describing normal behavior, and very few, sometimes even none or just one, datasets describing each type of fraudulent events. The case-based datasets 520 may be generated as disclosed herein, and may include the same number of datasets as the number of datasets describing normal behavior, for each type of fraudulent event that the ML classifier is trained to detect. Case-based datasets 520 of a specific type of fraudulent even may be generated using a single dataset describing this type of fraudulent event, the single dataset may be either real world dataset or manually generated dataset. In operation 540 the ML model or classifier may be used for analyzing real world data 550 for detecting the same types of fraudulent events the ML classifier was trained for. In operation 560 QA and QC are performed on software applications using real-world datasets and case-based datasets, as indicated by blocks 510 and 520, respectively.

Reference is made to FIG. 6, showing a high-level block diagram of an exemplary computing device according to some embodiments of the present invention. Computing device 600 may include a controller 605 that may be, for example, a central processing unit processor (CPU), a graphics processing unit (GPU), a chip or any suitable computing or computational device, an operating system 615, a memory 620, executable code 625, storage or storage device 630, input devices 635 and output devices 640. Controller 605 may be configured to carry out methods described herein, and/or to execute or act as the various modules, units, etc., for example by executing code or software. More than one computing device 600 may be included. For example, by executing executable code 625 stored in memory 620, controller 605 may be configured to carry out a method for generating case-based data as described herein.

Operating system 615 may be or may include any code segment (e.g., one similar to executable code 625 described herein) designed and/or configured to perform tasks involving coordination, scheduling, arbitration, supervising, controlling or otherwise managing operation of computing device 600, for example, scheduling execution of software programs or enabling software programs or other modules or units to communicate. Operating system 615 may be a commercial operating system.

Memory 620 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 620 may be or may include a plurality of, possibly different memory units. Memory 620 may be a computer or processor non-transitory readable medium, or a computer non-transitory storage medium, e.g., a RAM.

Executable code 625 may be any executable code, e.g., an application, a program, a process, task or script. Executable code 625 may be executed by controller 605 possibly under control of operating system 615. For example, executable code 625 may be an application that when executed generates case-based data as further described herein. Although, for the sake of clarity, a single item of executable code 625 is shown in FIG. 6, a system according to embodiments of the invention may include a plurality of executable code segments similar to executable code 625 that may be loaded into memory 620 and cause controller 605 to carry out methods described herein. For example, units or modules described herein may be, or may include, controller 605 and executable code 625.

Storage device 630 may be any applicable storage system, e.g., a disk or a virtual disk used by a VM. Storage 630 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 630 and may be loaded from storage 630 into memory 620 where it may be processed by controller 605. In some embodiments, storage device 630 may be used for storing data related to generating case-based data. In some embodiments, some of the components shown in FIG. 6 may be omitted. For example, memory 620 may be a non-volatile memory having the storage capacity of storage 630. Accordingly, although shown as a separate component, storage 630 may be embedded or included in memory 620.

Input devices 635 may be or may include a mouse, a keyboard, a touch screen or pad or any suitable input device. It will be recognized that any suitable number of input devices may be operatively connected to computing device 600 as shown by block 635. Output devices 640 may include one or more displays or monitors, speakers and/or any other suitable output devices. It will be recognized that any suitable number of output devices may be operatively connected to computing device 600 as shown by block 640. Any applicable input/output (I/O) devices may be connected to computing device 600 as shown by input devices 635 and output devices 640. For example, a wired or wireless network interface card (NIC), a printer, a universal serial bus (USB) device or external hard drive may be included in input devices 635 and/or output devices 640.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 620, computer-executable instructions such as executable code 625 and a controller such as controller 605.

The storage medium may include, but is not limited to, any type of disk including, semiconductor devices such as read-only memories (ROMs) and/or random access memories (RAMS), flash memories, electrically erasable programmable read-only memories (EEPROMs) or any type of media suitable for storing electronic instructions, including programmable storage devices. For example, in some embodiments, memory 620 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 605), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to some embodiments of the invention as described herein may include one or more devices such as computing device 600.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A computer implemented method for generating case-based data to train a machine learning (ML) model, the method comprising:
   receiving, by a processor, input data describing an event represented at least by one or more of data representing: money transfer between entities and servers on a network;
   transforming, by the processor, the input data into a first property graph describing the event and representing a first network, wherein the first property graph includes a plurality of network elements and properties of at least some of the plurality of network elements, wherein the network elements include entities and links describing relationships between the entities, wherein one or more of the links comprise one or more properties based on a link type, the link type comprising-a probability, and the links and entities comprise data that represents money transfer between entities, processes in machines, or servers on a network;
   calculating, by the processor, a risk score for the first network describing the likelihood of risk for suspicious financial activity;
   changing, by the processor, a network element in the first property graph to create a second property graph of a new network, the second property graph describing the event and representing a second network, wherein the second property graph includes a plurality of network elements and properties of at least some of the plurality of network elements, wherein the network elements include entities and links describing relationships between the entities, wherein the links of the new network comprise at least one property based on the one or more properties of the links of the first graph;
   calculating, by the processor, a distance between the first network and the new network, wherein calculating the distance comprises comparing a score calculated for the first network with a score calculated for the second network;
   repeating, by the processor, the changing of a network element, until the distance is within the predetermined range;
   using the second property graph, by the processor, as the case-based data;
   training an ML model using the case-based data; and
   using the ML model for analyzing real world data for detecting fraudulent events.

2. The method of claim 1, comprising transforming, by the processor, the second property graph of the new network into a selected data format.

3. The method of claim 1, wherein changing the network element comprises one of: adding a new entity and at least one link for connecting the new entity, deleting one entity and links connecting the deleted entity, adding one link and deleting one link.

4. The method of claim 1, comprising:
   deleting, by the processor, the properties of the at least some of the plurality of network elements;
   generating, by the processor, new properties; and
   distributing, by the processor, the new properties among elements of the second property graph of the new network.

5. The method of claim 4, comprising calculating, by the processor, statistics of the properties of the at least some of the plurality of network elements, wherein generating the new properties comprises preserving the calculated statistics by using at least one of: calculating cumulative distribution functions, minority over-sampling technique, using peers' statistics, and using machine learning clustering.

6. The method of claim 1, comprising:
   calculating, by the processor, a risk score for the new network;
   comparing, by the processor, the risk score of the first network to the risk score of the new network and calculating a difference between the risk score of the first network and the risk score of the new network; and
   if the difference between the risk score of the first network and the risk score of the new network is not within a predetermined range, then repeating, by the processor, the changing of a network element, the calculation of a risk score for the new network and the comparison until the difference between the risk score of the first network and the risk score of the new network is within the predetermined range.

7. The method of claim 1, wherein changing the network element is random.

8. The method of claim 1, wherein changing, by the processor, a network element in the first property graph to create a second property graph of a new network uses a link probability table describing the links of the first property graph.

9. The method of claim 1, wherein the input data describes an event represented by one or more computer tasks or one or more processes in a machine.

10. A computer implemented method for generating case-based data, the method comprising:
   a. receiving, by a processor, input data describing a fraudulent event represented at least by one or more of data representing: money transfer between entities, and servers on a network;
   b. changing the input data into a graph representing a first network, wherein the graph includes a plurality of nodes and links describing connections between nodes and properties of at least some of the nodes and links, wherein one or more of the links include a probability, and the links and entities comprise data that represents money transfer between entities, processes in machines, or servers on a network;
   c. calculating a risk score for the first network;
   d. calculating statistics of the properties of the at least some of the plurality of network nodes and links;
   e. generating a new network by performing at least one of: adding at least one node and at least one link for connecting the at least one new node, deleting at least one node and links connecting the at least one deleted node, adding at least one link, and deleting at least one link, wherein the links of the new network comprise at least one property based on the one or more properties of the links of the first network;

f. generating new properties of at least some of the plurality of links and nodes, wherein generating the new properties comprises preserving some of the calculated statistics;
g. replacing at least some properties of the at least some of the plurality of nodes and links with the new properties;
h. calculating a risk score for the new network;
i. calculating a difference between the risk score of the first network and the score of the new network;
j. repeating operations e-j until the difference between the risk score of the first network and the risk score of the new network is below a predetermined threshold; and
k. using the ML model for analyzing real world data for detecting fraudulent events.

11. The method of claim 10, comprising transforming the graph of the new network into a format of the input data.

12. A system for generating case-based data, the system comprising:
a memory;
a processor configured to:
receive input data describing an event represented at least by one or more of data representing: money transfer between entities, and servers on a network;
transform the input data into a first property graph describing the financial transaction event and representing a first network, wherein the first property graph includes a plurality of network elements and properties of at least some of the plurality of network elements, wherein the network elements include entities and links describing relationships between the entities, wherein one or more of the links comprise one or more properties based on a link type, the link type comprising a probability, and the links and entities comprise data that represents money transfer between entities, processes in machines, or servers on a network;
calculate, by the processor, a risk score for the first network describing the likelihood of risk for suspicious financial activity;
change a network element in the first property graph to create a second property graph of a new network, wherein the links of the second property graph of the new network comprise at least one property based on the one or more properties of the first property graph;
calculate a distance between the first network and the new network, wherein calculating the distance comprises comparing a score calculated for the first network with a score calculated for the second network;
if the distance is not within a predetermined range, wherein the range is defined as being above a first threshold and below a second threshold, then repeat the changing of a network element; and
if the distance is within the predetermined range, then use the second property graph as the case-based data;
train an ML model using the case-based data; and
use the ML model for analyzing real world data for detecting fraudulent events.

13. The system of claim 12, wherein the processor is configured to transform the second property graph of the new network into a selected data format.

14. The system of claim 12, wherein the processor is configured to change the network element by one of: adding a new entity and at least one link for connecting the new entity, deleting one entity and links connecting the deleted entity, adding one link, and deleting one link.

15. The system of claim 12, wherein the processor is configured to:

delete the properties of the at least some of the plurality of network elements;
generate new properties; and
distribute the new properties among elements of the second property graph of the new network.

16. The system of claim 15, wherein the processor is configured to calculate statistics of the properties of the at least some of the plurality of network elements, and to generate the new properties by preserving the calculated statistics by using at least one of: calculating cumulative distribution functions, minority over-sampling technique, using peers' statistics, and using machine learning clustering.

17. The system of claim 12, wherein the processor is configured to:
calculate a risk score for the new network;
compare the risk score of the first network to the risk score of the new network; and
if a difference between the risk score of the first network and the risk score of the new network is not within a predetermined range, then repeat the changing of a network element, the calculation of a risk score for the new network and the comparison until the difference between the risk score of the first network and the risk score of the new network is within the predetermined range.

18. The method of claim 12, wherein the processor is configured to change the network element randomly.

19. The system of claim 12, wherein the processor is configured to change a network element in the first property graph to create a second property graph of a new network using a link probability table describing the links of the first property graph.

20. A computer implemented method for generating case-based data to train a machine learning (ML) model, the method comprising:
receiving, by a processor, input data describing an event represented at least by one or more of data representing: money transfer between entities and servers on a network;
transforming, by the processor, the input data into a first property graph describing the event and representing a first network, wherein the first property graph includes a plurality of network elements and properties of at least some of the plurality of network elements, wherein the network elements include entities and links describing relationships between the entities, wherein the links include data including a probability, and the links and entities comprise data that represents money transfer between entities, processes in machines, or servers on a network;
calculating, by the processor, a risk score for the first network describing the likelihood of risk for suspicious financial activity;
changing, by the processor, a network element in the first property graph to create a second property graph of a new network, the second property graph describing the event and representing a second network, wherein the second property graph includes a plurality of network elements and properties of at least some of the plurality of network elements, wherein the network elements include entities and links describing relationships between the entities, wherein the links of the new network comprise at least one property based on the one or more properties of the links of the first graph;
using the second property graph, by the processor, as the case-based data;

training an ML model using the case-based data; and
using the ML model for analyzing real world data for detecting fraudulent events.

* * * * *